No. 858,948. PATENTED JULY 2, 1907.
A. M. BURNSIDE.
MACHINE FOR MAKING PAPER BOARD BOXES.
APPLICATION FILED JAN. 15, 1907.
3 SHEETS—SHEET 2.
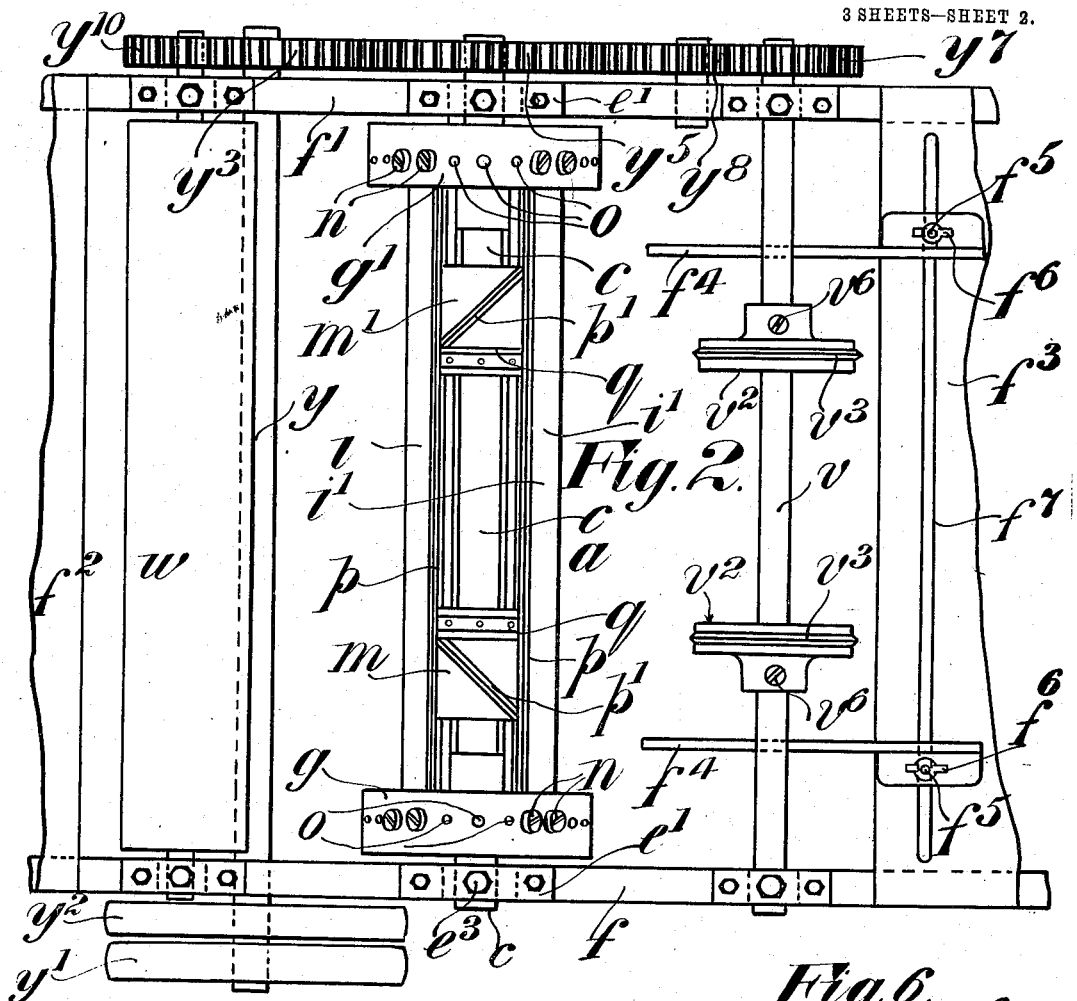
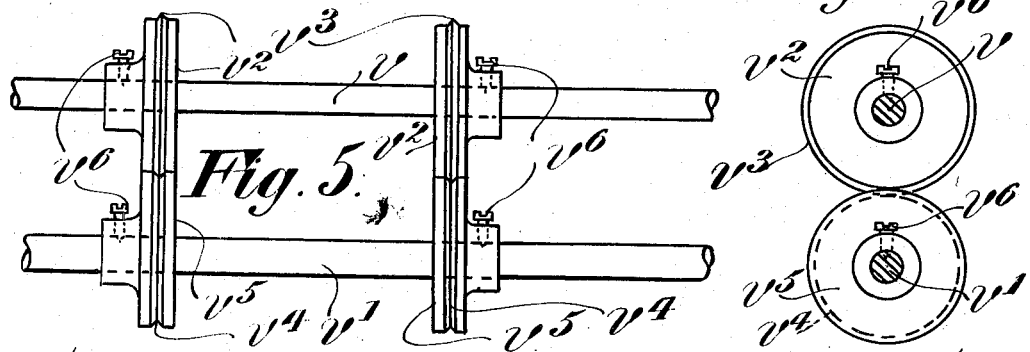
Witnesses:
P. F. Nagle.
L. Donville.
Inventor.
By Alexander Mitchell Burnside.
Wiedersheim & Fairbanks.
Attorneys.

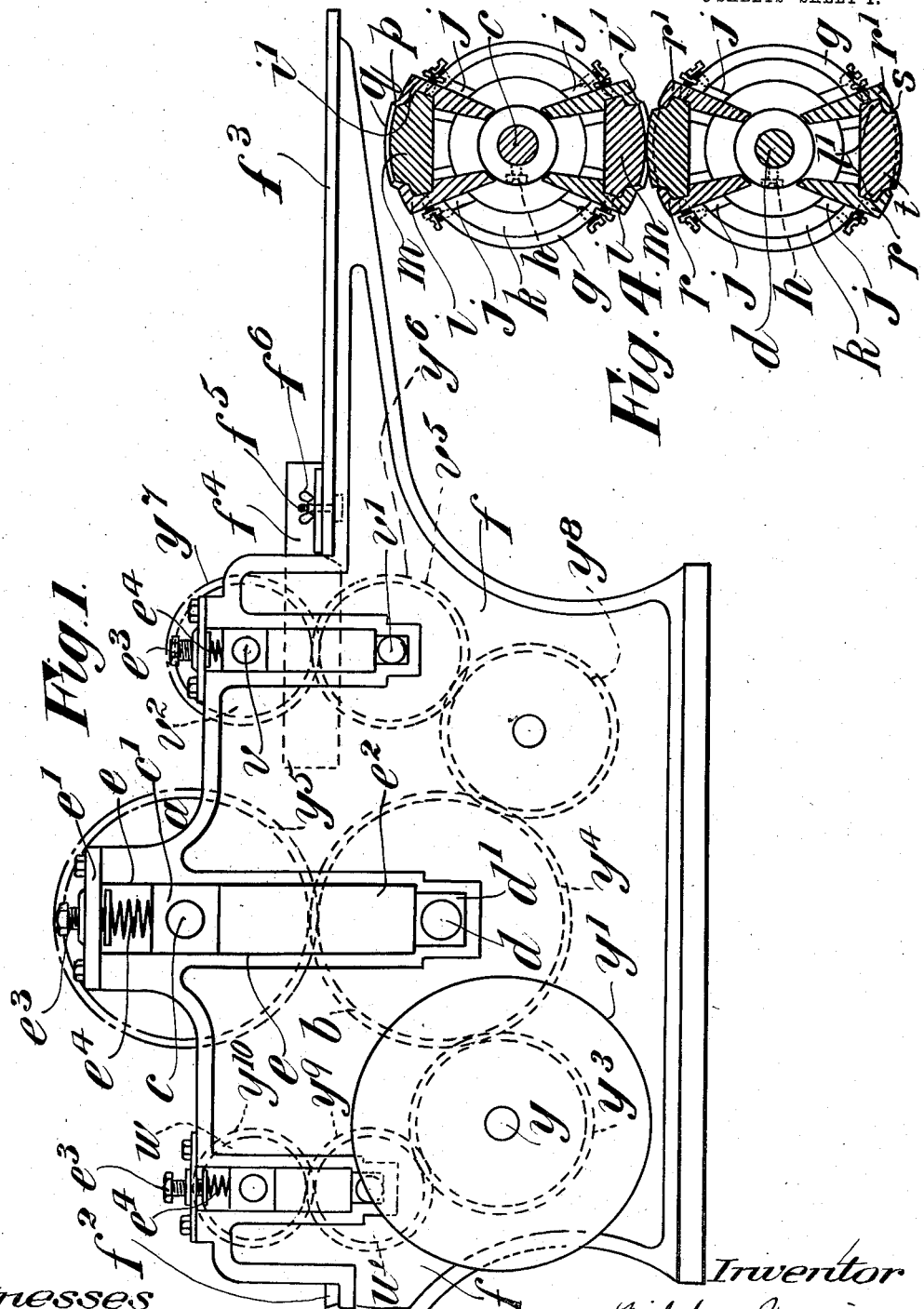

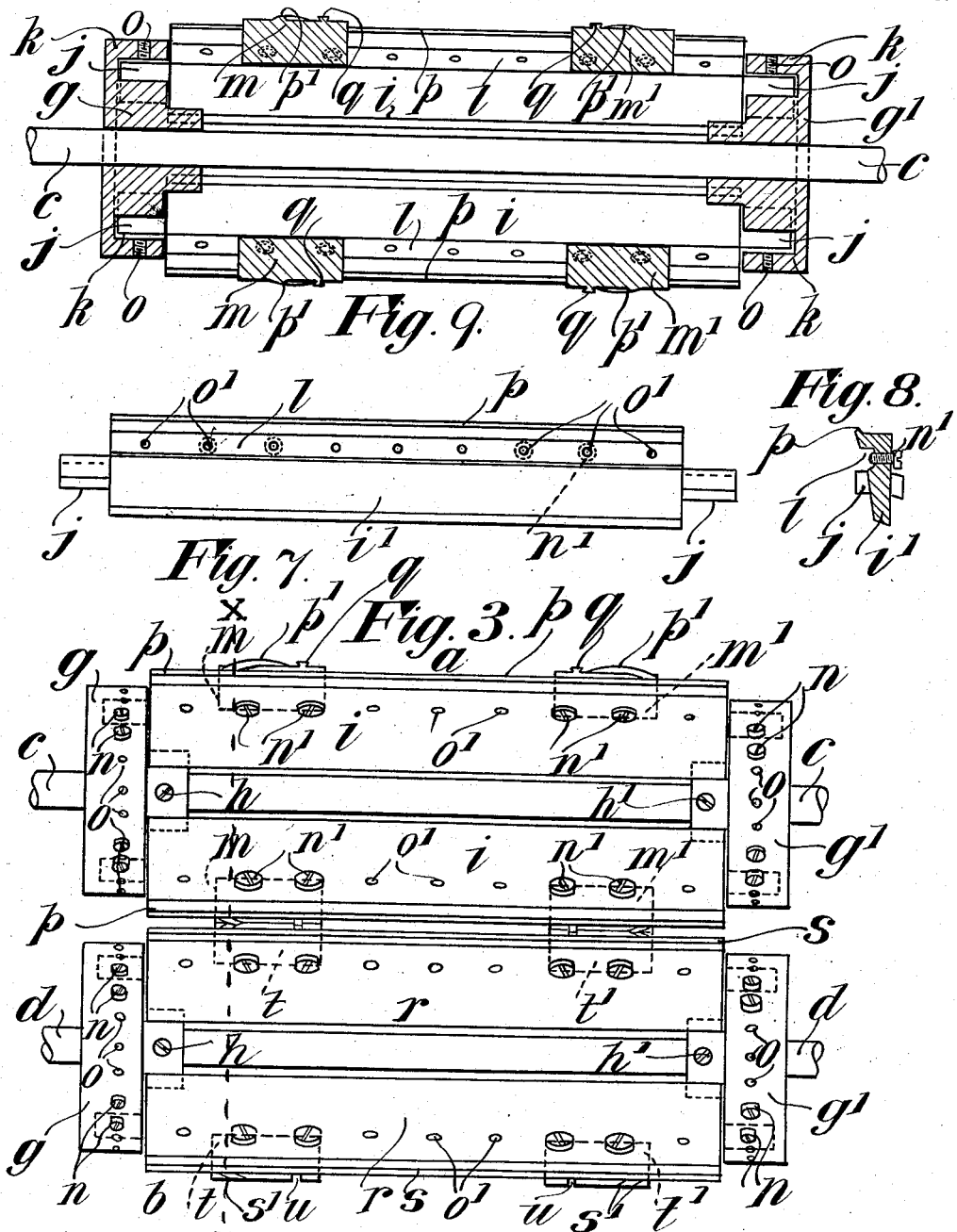

UNITED STATES PATENT OFFICE.

ALEXANDER MITCHELL BURNSIDE, OF LARGS, SCOTLAND.

MACHINE FOR MAKING PAPER-BOARD BOXES.

No. 858,948.     Specification of Letters Patent.     Patented July 2, 1907.

Application filed January 15, 1907. Serial No. 352,400½.

*To all whom it may concern:*

Be it known that I, ALEXANDER MITCHELL BURNSIDE, a subject of the King of Great Britain, residing at Glenview, Gogo street, Largs, Ayrshire, Scotland, have invented certain new and useful Improvements in Machines for Making Paper-Board Boxes, of which the following is a specification.

This invention relates to machines for making paper board boxes in which the paper board is passed between rollers and cut and creased.

The feature of this invention is that the rollers are made in a number of adjustable parts so that the knives and benders can be altered in order to make various sizes of boxes.

I preferably make the machine with two central rollers preferably arranged as a vertical pair. These rollers are driven by gearing from a power shaft, or otherwise, and are provided, the one with creasing or bending ridges or parts and cutting knives and the other with recesses or grooves with which the ridges and knives engage, in such manner as to crease and cut the paper board which is passed between the rollers. There may be arranged in front of the central rollers two pairs of creasing rollers or wheels, adjustably secured on their shafts, and driven in any suitable manner. A vertical pair of receiving rollers is also provided behind the central rollers and is driven in any suitable manner so as to receive and deliver the paper board blanks after being cut and creased. The central rollers, the front wheels, or rollers, and the receiving rollers may all be provided with suitable spring or weight adjustments at their bearings. The central rollers are provided with means whereby the creasers and cutters attached thereto may be adjusted or replaced by others to suit different sizes or forms of boxes.

In order that my said invention may be clearly understood I have hereunto appended explanatory sheets of drawings which show, by way of example, one form in which the machine may be constructed.

On the drawings. Figure 1 is a side view of the machine. Fig. 2 is a plan thereof. Fig. 3 is a front view of the central creasing and cutting rollers. Fig. 4 is a cross section taken on the line X. X. Fig. 3. Fig. 5 is a front view of the creasing wheels or rollers $v^2$, $v^5$, and Fig. 6 is a side view of the same. Fig. 7 is a view of one of the cross pieces $i$ and Fig. 8 is a section of the same. Fig. 9 is a longitudinal section through one of the rollers.

The same reference letters wherever repeated on the drawings indicate the same or similar parts.

In constructing the machine the central rollers $a$, $b$, are fitted on shafts $c$, $d$, which work in suitable bearing blocks $c^1$, $d^1$, at each end thereof. The bearing blocks $c^1$, $d^1$, are fitted in vertical slots $e$ in the side cheeks $f$, $f^1$ of the machine in such manner that on the removal of the cover plates $e^1$ the roller $a$ may be removed and on the removal of the distance pieces $e^2$ the roller $b$ may be lifted vertically up and also removed. The upper central roller $a$ is constituted by two end pieces $g$, $g^1$ secured to the shaft $c$ by means of the pinching screws $h$, $h^1$ and connected together by means of the cross pieces $i$, $i^1$ which are arranged in pairs. The cross pieces $i$, $i^1$ are provided, at each of their ends, with an extension piece $j$ which is made so as to fit into a deep circular groove or recess $k$ made for its reception on the inner face of the end piece $g$ or $g^1$. The extension pieces $j$ are capable of being moved in a circular path in the recesses $k$ thereby increasing or diminishing the distance between the inner faces of each pair of pieces $i$, $i^1$ and of being clamped in any adjusted position in the recesses by means of pinching screws $n$ which can be inserted in the radial and screwed holes $o$ in the ends $g$, $g^1$. These holes $o$ are preferably arranged about one inch or so apart so as to enable the pieces $i$, $i^1$ to be adjusted as desired for various sizes of boxes.

The inner face of each of the pieces $i$, $i^1$ is provided with a longitudinal groove or recess $l$. Supported between the inner faces of each pair of pieces $i$, $i^1$ are two blocks $m$, $m^1$ the ridges $l^1$ on the sides of which are adapted to fit into the longitudinal recesses $l$ in such manner that the blocks $m$, $m^1$ may be adjusted longitudinally of the roller. A series of screwed holes $o^1$ is made in each piece $i$, $i^1$ so that when the blocks are adjusted in any desired position they can be held rigidly in place between the pieces $i$, $i^1$ by inserting set screws $n^1$ into the proper holes and screwing them up so as to pinch the blocks tightly. The pieces $i$, $i^1$ are each provided with a longitudinal ridge or creaser $p$ while the blocks $m$, $m^1$ are each provided with a cutting knife $q$ and a ridge or creaser $p^1$ which latter runs diagonally of the block. The lower central roller $b$ is similar in construction being constituted by two end pieces $g$, $g^1$ connected by the pieces $r$, $r^1$ which, however, are provided with longitudinal grooves $s$ for the reception of the corresponding ridges or creasers $p$ on the roller $a$. The blocks $t$, $t^1$ are provided with slots $u$, $u$, for the reception of the cutting knives $q$, $q$, and are also provided with diagonal grooves $s^1$ for the reception of the diagonal creasers $p^1$.

Fitted in front of the central rollers $a$, $b$, is a pair of parallel shafts $v$, $v^1$ the upper one $v$ of which is provided with two wheels or rollers $v^2$, $v^2$, each provided at its periphery with an endless ridge or creaser $v^3$ which engages with a corresponding groove $v^4$ formed on the periphery of each of the wheels or rollers $v^5$ $v^5$, fitted on the lower shaft $v^1$. The wheels or rollers $v^2$, $v^5$, are arranged so as to crease or groove the cardboard as it passes between them before being received by the central rollers $a$, $b$. Pinching screws $v^6$ are provided for securing these wheels or rollers to their shafts so that they may be readily adjusted longitudinally thereof. Arranged behind the central rollers $a$, $b$, are two receiving rollers $w$, $w$, arranged the one above the other so as to receive the cardboard as it leaves the central rollers and convey it to the receiving table $f^2$ provided at the back of the machine.

The feed table $f^3$ which is arranged at the front of the machine, is provided with two backwardly projecting guides $f^4$ which are secured adjustably thereto by means of bolts $f^5$ and winged nuts $f^6$. The bolts $f^5$ extend through a slot $f^7$ formed at the back of the feed table in such manner that the guides may be readily moved and adjusted to properly guide pieces of cardboard of different breadths to the rollers.

The creasing wheels or rollers $v^2$, $v^5$, and the receiving rollers $w$, $w$, may all be provided with movable bearings such as those above described in connection with the central rollers $a$, $b$. The central rollers, the creasing wheels or rollers and the receiving rollers may all be provided with means such as adjustable screws $e^3$ and springs $e^4$ whereby the pressure of the top rollers on the bottom rollers may be regulated.

The mechanism may be driven from the shaft $y$ which is provided at its one end with fast and loose pulleys $y^1$, $y^2$, and at its other end with a gear wheel $y^3$ which drives the gear wheel $y^4$ on the end of the shaft $d$. The shaft $c$ is also provided with a gear wheel $y^5$ on its end and by means of which it is driven. The shaft $v^1$ is provided with a gear wheel $y^6$ which drives another gear wheel $y^7$ provided on the shaft $v$ and which is itself driven by the idle wheel $y^8$ driven by the gear wheel $y^4$. The lower receiving roller shaft is also provided with a gear wheel $y^9$ which drives another gear wheel $y^{10}$ on the upper receiving roller shaft and which is driven by the gear wheel $y^3$ on the driving shaft $y$. As before stated, the blocks with their knives and benders or creasers can be moved nearer together or further apart so as to make boxes of different breadths.

When it is desired to make boxes of different lengths the positions of the cross pieces $i$, $i^1$ and $r$, $r$, have to be altered and broader or narrower blocks inserted between them and clamped in place. The knives and creasers would be made and arranged so as to suit the type of box being manufactured. It is found an advantage in most cases to make the special creasers $v^2$, $v^5$, for making the longitudinal creases on the cardboard, the rollers $a$, $b$, being merely used to do the cross creases, cuts, and also the diagonal creases or cuts if such are necessary. The pieces of cardboard or other paper board may be fed to the machine by hand or automatically.

The parts of the machine may be altered or modified in construction to suit the class of box being made.

Having now fully described my invention what I claim and desire to secure by Letters Patent is:—

1. In a machine for making paper board boxes a roller made in sections comprising in combination two end pieces each having a circular groove therein and longitudinal pieces extending between the end pieces and provided with extensions which fit into said circular grooves and can be adjustably secured therein.

2. In a machine for making paper board boxes a roller made in sections comprising two end pieces each having a circular groove therein, longitudinal pieces extending between the end pieces and provided with extensions which fit into said circular grooves and can be adjustably secured in place and blocks arranged between the longitudinal pieces and adjustably secured thereto.

3. In a machine for making paper board boxes, a roller made in sections comprising a shaft, two end pieces on the shaft said end pieces each having a circular groove therein longitudinal pieces arranged between the end pieces and having extensions which fit into said circular grooves said longitudinal pieces having longitudinal grooves, blocks fitted between the longitudinal pieces and means for adjustably securing them in the longitudinal grooves thereof.

4. In a machine for making paper board boxes a roller consisting of a shaft, end pieces thereon, longitudinal strips with creasers arranged between the end pieces and being adjustably and removably secured thereto and blocks with knives, adjustably and removably secured between the longitudinal pieces.

5. In a machine for making paper board boxes a roller having, in combination end pieces with circular grooves therein, longitudinal strips with creases thereon said strips having end pieces adapted to fit into the said circular grooves, a longitudinal groove in each strip, blocks with knives thereon said blocks having ridges adapted to fit in the grooves of the strips.

6. In a machine for making paper board boxes a roller having, in combination, two end pieces with circular grooves therein, two longitudinal strips with extensions thereon adapted to fit said circular grooves, means for locking these strips in position and blocks arranged between the longitudinal strips and being adjustably and removably secured thereto.

7. In a machine for making paper board boxes a roller having, in combination, two end pieces with circular grooves therein, four longitudinal strips arranged in pairs each strip having a longitudinal groove therein, curved extensions on the strips fitted in said grooves in the end pieces and blocks arranged between the longitudinal strips and adjustably and removably secured thereto.

8. In a machine for making paper board boxes a roller having in combination two end pieces with circular grooves therein, four longitudinal strips with creasing knives thereon arranged in pairs each strip having a longitudinal groove therein, curved extensions on the strips and blocks with knives thereon arranged between the longitudinal strips and adjustably and removably secured thereto.

9. In a machine for making paper board boxes a roller having in combination two end pieces, longitudinal strips arranged between the end pieces and having extensions received within the end pieces capable of circumferential adjustment and blocks arranged between the strips and being capable of longitudinal adjustment and also of being locked in position thereon.

10. A machine for making paper board boxes having cutting and creasing rollers arranged one above the other each of said rollers being made in sections comprising two end pieces longitudinal strips extending between and having extensions received within the end pieces and adjustably and removably secured to said end pieces, blocks adjustably and removably secured between the longitudinal strips, knives, creasers, and means for rotating the rollers.

11. A machine for making paper board boxes having a pair of rollers each of which is made up of two end pieces, removable, adjustable, and interchangeable longitudinal strips having extensions received within the end pieces, removable, adjustable and interchangeable blocks secured to and between the longitudinal strips aforesaid and knives and creasers.

In testimony whereof I affix my signature in presence of two witnesses.

ALEXANDER MITCHELL BURNSIDE.

Witnesses:
JAMES AIKEN,
WILLIAM FLEMING.